(12) United States Patent
Dziubinschi et al.

(10) Patent No.: US 11,092,388 B2
(45) Date of Patent: Aug. 17, 2021

(54) HEAT EXCHANGER WITH INTEGRATED NOISE SUPPRESSION

(71) Applicant: Hanon Systems, Daejeon (KR)

(72) Inventors: Orest Alexandru Dziubinschi, Dearborn, MI (US); Kastriot Shaska, Northville, MI (US); Brian James Cardwell, Ypsilanti, MI (US)

(73) Assignee: HANON SYSTEMS, Daejeon (KR)

( * ) Notice: Subject to any disclaimer, the term of this patent is extended or adjusted under 35 U.S.C. 154(b) by 223 days.

(21) Appl. No.: 16/395,876

(22) Filed: Apr. 26, 2019

(65) Prior Publication Data

US 2019/0249935 A1 Aug. 15, 2019

Related U.S. Application Data

(63) Continuation of application No. 14/751,459, filed on Jun. 26, 2015, now abandoned.

(60) Provisional application No. 62/034,941, filed on Aug. 8, 2014.

(51) Int. Cl.
| | | |
|---|---|---|
| *F28F 9/00* | (2006.01) | |
| *F02B 29/04* | (2006.01) | |
| *F28F 9/02* | (2006.01) | |
| *F28D 21/00* | (2006.01) | |

(52) U.S. Cl.
CPC ............ *F28F 9/005* (2013.01); *F02B 29/045* (2013.01); *F28F 9/028* (2013.01); *F28F 9/0278* (2013.01); *F28D 2021/0082* (2013.01); *F28F 2265/28* (2013.01); *Y02T 10/12* (2013.01)

(58) Field of Classification Search
CPC .. F28F 9/00; F28F 9/005; F28F 9/0278; F28F 9/028; F28F 9/0282; F28F 9/026; F28F 9/0263; F28F 9/0265; F28F 9/027; F28F 9/0273; F28F 9/0275; F28F 2265/28; F28F 2265/30; F02B 29/045; F02B 29/0456; Y02T 10/12; F28D 2021/0082
See application file for complete search history.

(56) References Cited

U.S. PATENT DOCUMENTS

| | | | | |
|---|---|---|---|---|
| 2,014,666 | A | * 9/1935 | Peik ......................... | F01N 1/10 |
| | | | | 181/252 |
| 2,403,699 | A | * 7/1946 | Wilson .................... | F01N 1/166 |
| | | | | 181/241 |
| 2,502,016 | A | 3/1950 | Olson | |

(Continued)

FOREIGN PATENT DOCUMENTS

| | | |
|---|---|---|
| JP | 02-039956 U | 3/1990 |
| JP | 06-060723 U | 8/1994 |

(Continued)

*Primary Examiner* — Jianying C Atkisson
*Assistant Examiner* — Miguel A Diaz
(74) *Attorney, Agent, or Firm* — Shumaker, Loop & Kendrick, LLP; James D. Miller

(57) ABSTRACT

A method of passively suppressing noise within a heat exchanger comprises the steps of preselecting a plurality of sound wave travel distances formed between a plurality of surfaces within the heat exchanger to cause destructive interference of a preselected set of sound waves as the sound waves travel the preselected sound wave travel distances and assembling the heat exchanger to have the preselected plurality of sound wave travel distances formed between the plurality of surfaces formed within the heat exchanger.

15 Claims, 2 Drawing Sheets

(56) References Cited

U.S. PATENT DOCUMENTS

| | | | |
|---|---|---|---|
| 2,555,055 A | 5/1951 | Ort | |
| 2,705,541 A * | 4/1955 | Finch | F01N 1/10 |
| | | | 181/243 |
| 2,784,797 A * | 3/1957 | Bailey | F01N 1/08 |
| | | | 181/255 |
| 2,834,425 A * | 5/1958 | Rawson | F01N 13/185 |
| | | | 181/252 |
| 3,692,140 A | 9/1972 | Smith | |
| 3,703,937 A | 11/1972 | Tenney | |
| 3,712,029 A | 1/1973 | Charlton | |
| 3,786,791 A | 1/1974 | Richardson | |
| 3,810,450 A | 5/1974 | Woodhouse | |
| 3,874,711 A | 4/1975 | Scalzo et al. | |
| 3,941,206 A | 3/1976 | Halter | |
| 3,977,493 A | 8/1976 | Richardson | |
| 4,335,797 A | 6/1982 | Simmons | |
| 4,382,468 A | 5/1983 | Hastwell | |
| 4,409,787 A | 10/1983 | Davi et al. | |
| 4,461,279 A | 7/1984 | Gaden | |
| 4,465,307 A | 8/1984 | de Lange | |
| 4,502,297 A | 3/1985 | Winterer | |
| 4,524,823 A | 6/1985 | Hummel et al. | |
| 4,574,914 A | 3/1986 | Flugger | |
| 4,621,677 A | 11/1986 | Suzuki et al. | |
| 4,786,185 A * | 11/1988 | Knief | B01F 5/0682 |
| | | | 261/108 |
| 5,123,502 A | 6/1992 | Flugger | |
| 5,304,749 A | 4/1994 | Crandell | |
| 5,313,803 A | 5/1994 | Detzer | |
| 5,371,331 A | 12/1994 | Wall | |
| 5,444,197 A | 8/1995 | Flugger | |
| 5,806,585 A | 9/1998 | Yoshida et al. | |
| D401,945 S | 12/1998 | Cunningham et al. | |
| 5,925,857 A | 7/1999 | Birkel et al. | |
| 5,952,625 A | 9/1999 | Huff | |
| 5,992,560 A | 11/1999 | Matsuoka et al. | |
| 6,089,346 A | 7/2000 | Tredinnick et al. | |
| 6,089,347 A | 7/2000 | Flugger | |
| 6,145,616 A | 11/2000 | Ewanek | |
| 6,209,628 B1 | 4/2001 | Sugimoto et al. | |
| 6,286,623 B1 | 9/2001 | Shaya | |
| 6,729,386 B1 | 5/2004 | Sather | |
| 6,832,665 B2 * | 12/2004 | Crombeen | F01N 3/303 |
| | | | 181/275 |
| 6,868,695 B1 | 3/2005 | Dingel et al. | |
| 7,117,974 B2 | 10/2006 | Moenssen et al. | |
| 7,219,764 B1 | 5/2007 | Forbes | |
| 7,221,566 B1 | 5/2007 | Gao et al. | |
| 7,389,852 B2 | 6/2008 | Voss et al. | |
| 7,600,607 B2 * | 10/2009 | Sullivan | F01N 5/025 |
| | | | 181/250 |
| 7,743,880 B2 | 6/2010 | Matsumura et al. | |
| 8,083,026 B1 | 12/2011 | Butler | |
| 8,307,944 B2 | 11/2012 | Reinheimer et al. | |
| 8,356,476 B2 | 1/2013 | Gall et al. | |
| 8,371,419 B2 | 2/2013 | Nonogi et al. | |
| 8,863,891 B2 | 10/2014 | Glav | |
| 8,991,185 B2 | 3/2015 | Huber et al. | |
| 9,188,360 B2 | 11/2015 | Jung et al. | |
| 9,856,766 B2 | 1/2018 | Kase et al. | |
| 9,920,670 B1 | 3/2018 | Wright | |
| 10,816,277 B2 * | 10/2020 | Dziubinschi | F28D 1/0391 |
| 2003/0214055 A1 | 11/2003 | Yazici et al. | |
| 2004/0050618 A1 | 3/2004 | Marocco | |
| 2005/0284608 A1 | 12/2005 | Huang et al. | |
| 2005/0284691 A1 | 12/2005 | Voss et al. | |
| 2006/0054381 A1 | 3/2006 | Takemoto et al. | |
| 2006/0054384 A1 | 3/2006 | Chen | |
| 2007/0002918 A1 | 1/2007 | Niemoeller et al. | |
| 2007/0107982 A1 | 5/2007 | Sullivan | |
| 2007/0272482 A1 | 11/2007 | Yamaguchi et al. | |
| 2008/0229732 A1 * | 9/2008 | Matsunami | B01D 46/448 |
| | | | 60/299 |
| 2009/0000777 A1 | 1/2009 | Wanni et al. | |
| 2010/0213002 A1 | 8/2010 | Oboodi et al. | |
| 2010/0300647 A1 | 12/2010 | Steurer et al. | |
| 2011/0005856 A1 | 1/2011 | Larson | |
| 2011/0186378 A1 | 8/2011 | Petschenig | |
| 2011/0226005 A1 | 9/2011 | Lee | |
| 2011/0265484 A1 | 11/2011 | Huber et al. | |
| 2011/0303398 A1 | 12/2011 | Scott et al. | |
| 2012/0024413 A1 | 2/2012 | Yang et al. | |
| 2013/0112381 A1 | 5/2013 | Valente | |
| 2013/0167506 A1 | 7/2013 | Nord et al. | |
| 2013/0228318 A1 | 9/2013 | Williams et al. | |
| 2014/0123697 A1 | 5/2014 | Ito | |
| 2015/0027629 A1 | 1/2015 | Butler et al. | |
| 2015/0075166 A1 | 3/2015 | Minuth | |
| 2016/0018167 A1 | 1/2016 | Dziubinschi et al. | |
| 2016/0169229 A1 | 6/2016 | Kimura et al. | |
| 2016/0210391 A1 | 7/2016 | Flamant et al. | |
| 2017/0074288 A1 | 3/2017 | Venugopal Setty et al. | |
| 2018/0135514 A1 | 5/2018 | Setty et al. | |

FOREIGN PATENT DOCUMENTS

| | | | | |
|---|---|---|---|---|
| JP | 2000240514 A | 9/2000 | | |
| JP | 2000-292077 A | 10/2000 | | |
| JP | 2000292077 A | * 10/2000 | | F28F 9/0273 |
| JP | 2000292077 A | 10/2000 | | |
| KR | 10-2012-0031988 A | 4/2012 | | |

* cited by examiner

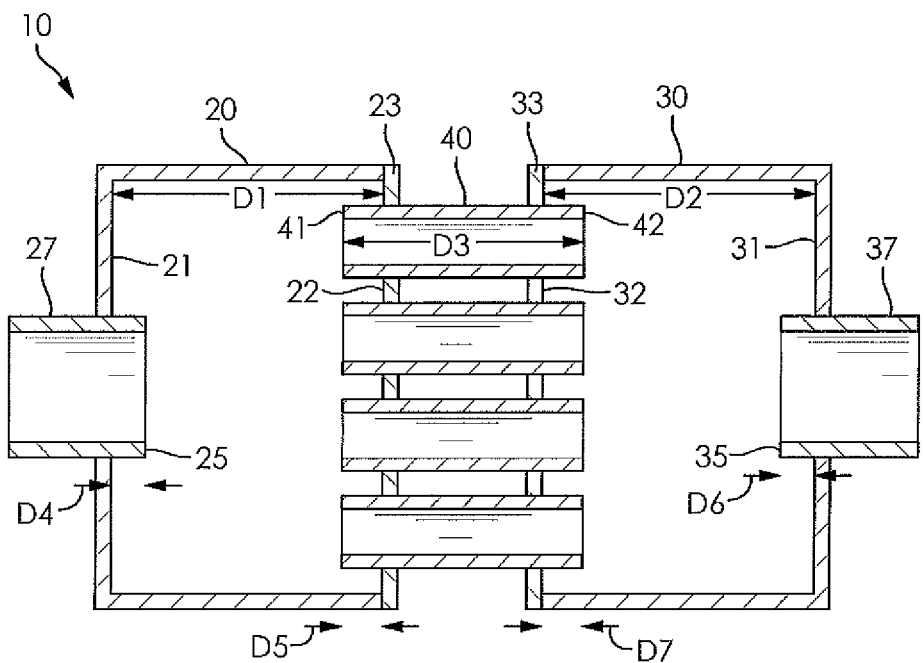
FIG. 1
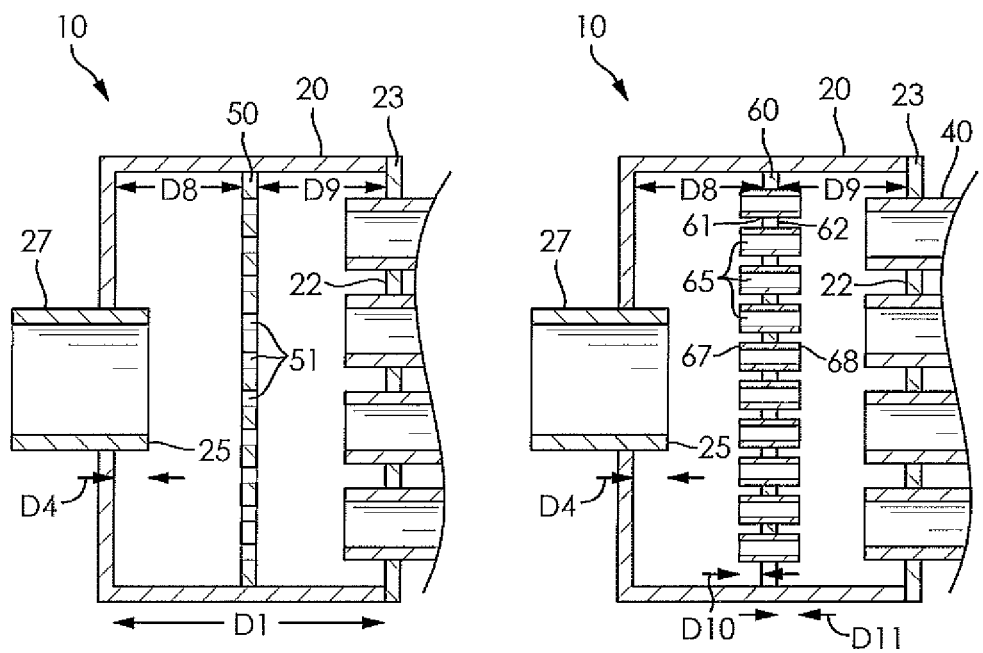
FIG. 2
FIG. 3

HEAT EXCHANGER WITH INTEGRATED NOISE SUPPRESSION

CROSS-REFERENCE TO RELATED APPLICATION

This patent application is a continuation patent application of U.S. patent application Ser. No. 14/751,459, filed Jun. 26, 2015 which claims priority to U.S. Provisional Patent Application Ser. No. 62/034,941, filed Aug. 8, 2014, the entire disclosures of which are hereby incorporated herein by reference.

FIELD OF THE INVENTION

The invention relates to a heat exchanger, and more specifically to a heat exchanger including passive noise suppression features.

BACKGROUND OF THE INVENTION

Modern spark ignition and diesel internal combustion engines utilize turbochargers to improve performance and efficiency. The turbocharger compresses a stream of air, causing the air to have an increased temperature and pressure. However, it is desirable for the air entering the engine to be cooled after exiting the turbocharger because cooler air will have an increased density, thereby improving the efficiency of the engine. Typically, a system including a turbocharger will therefore also include a heat exchanger such as a charge air cooler (CAC) or a water cooled charge air cooler (WCAC) disposed downstream of the turbocharger to cool the stream of air that has been compressed by the turbocharger. The cooling of the air may also eliminate the danger of pre-detonation of the air and a fuel prior to a timed spark ignition.

Most charge air coolers include an inlet tank that distributes the air stream through a plurality of heat exchanger passages. A second fluid acting as a coolant flows over the plurality of heat exchanger passages and removes heat from the air flowing therethrough. The air then exits the plurality of heat exchanger passages and enters an outlet tank. The outlet tank includes an outlet through which the air stream exits the charge air cooler before entering an intake region of the engine.

One issue associated with the charge air cooler is the production of undesirable sound frequencies and amplitudes that travel with the stream of air flowing through the charge air cooler. These undesirable sound frequencies and amplitudes may propagate through the system and be heard by a passenger of a vehicle having the charge air cooler. These sounds can be bothersome and even distracting to the passenger.

It would therefore be desirable to produce a heat exchanger for use with a turbocharged system that militates against a generation of undesirable sound frequencies and amplitudes by providing a passive noise suppression system integrated within the heat exchanger.

SUMMARY OF THE INVENTION

Compatible and attuned with the present invention, a heat exchanger having a passive noise suppression system integrated therein has surprisingly been discovered.

In one embodiment of the invention, a heat exchanger comprises an inlet tank having a hollow interior, an inlet conduit in fluid communication with the hollow interior of the inlet tank, an outlet tank having a hollow interior, a heat exchanger passage extending between the inlet tank and the outlet tank, and a sound suppression structure integrated in at least one of the inlet tank, the outlet tank, and the heat exchanger passage. The sound suppression structure is configured to passively suppress a preselected set of sound waves present within the heat exchanger.

A method of passively suppressing noise within a heat exchanger is also disclosed. The method comprises the steps of preselecting a plurality of sound wave travel distances formed between a plurality of surfaces within the heat exchanger to cause destructive interference of a preselected set of sound waves as the sound waves travel the preselected sound wave travel distances; and assembling the heat exchanger to have the preselected plurality of sound wave travel distances formed between the plurality of surfaces formed within the heat exchanger.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 1 is a cross-sectional elevational view of a heat exchanger according to an embodiment of the invention;

FIG. 2 is a fragmentary cross-sectional elevational view of an inlet tank of the heat exchanger illustrated in FIG. 1 having a perforated plate;

FIG. 3 is a fragmentary cross-sectional elevational view of an inlet tank of the heat exchanger illustrated in FIG. 1 having a plate with a plurality of conduits extending therethrough;

DETAILED DESCRIPTION OF THE INVENTION

Figure 4:
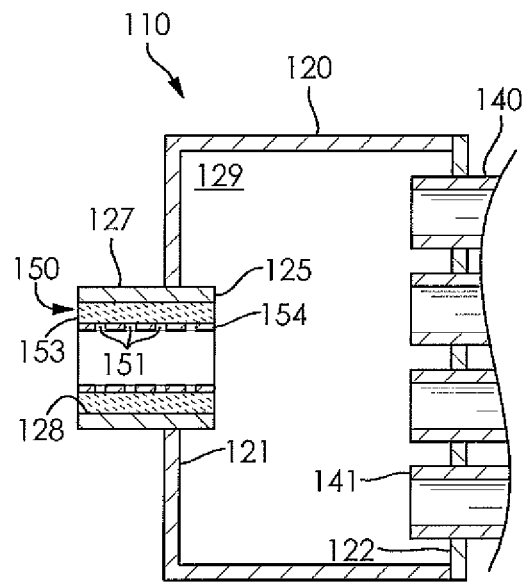
FIG. 4 is a fragmentary cross-sectional elevational view of an inlet tank of a heat exchanger having a first sound absorption feature according to another embodiment of the invention.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 illustrates a heat exchanger 10 having a passive sound suppression structure integrated therein according to an embodiment of the invention. The heat exchanger 10 includes an inlet tank 20, an outlet tank 30, and a plurality of heat exchanger passages 40 extending longitudinally from the inlet tank 20 to the outlet tank 30. Although four heat exchanger passages 40 are shown in the drawings, it is understood that more or fewer of the heat exchanger passages 40 can be used as desired. The inlet tank 20 acts an inlet manifold for receiving a first fluid therein and distributing the first fluid to each of the heat exchanger passages 40. The outlet tank 30 acts as an outlet manifold for collecting and recombining the first fluid from the plurality of the heat exchanger passages 40 before the first fluid exits the heat exchanger 10. Each of the heat exchanger passages 40 may extend substantially parallel to an adjacent one of the heat exchanger passages 40 while being spaced apart in a direction perpendicular to a longitudinal axis of each of the heat exchanger passages 40. Accordingly, the plurality of heat exchanger passages 40 may be formed in a stacked array wherein each row of the array includes one or more of the heat exchanger passages 40. In other words, although shown stacked vertically in the drawings, it is understood the heat exchanger passages can be stacked horizontally, both horizontally and vertically, or have other patterns or configurations as desired. The inlet tank 20 and the outlet tank 30 each extend longitudinally in a direction perpendicular to the longitudinal axis of each of the heat exchanger passages 40.

The heat exchanger 10 may be used in conjunction with a turbocharger system of a motor vehicle. Accordingly, the first fluid may be air that has been turbocharged in a turbocharger of the motor vehicle for use within the engine of the motor vehicle. However, the structures and methods disclosed herein may be adapted for use in any suitable application where noise suppression is desirable within a heat exchanging structure.

The passive sound suppression structure of the heat exchanger 10 is comprised of a plurality of surfaces formed within the heat exchanger 10 being spaced apart from each other by a plurality of preselected sound wave travel distances, thereby promoting destructive interference of at least a portion of a preselected range of the sound waves traveling through the heat exchanger 10. The plurality of surfaces may be formed in at least one of the inlet tank 20, the outlet tank 30, and each of the heat exchanger passages 40. The plurality of sound travel distances are described in greater detail hereinbelow.

The inlet tank 20 has an interior width D1, the outlet tank 30 has an interior width D2, and each of the heat exchanger passages 40 has a length D3. The width D1 is a distance measured from a first interior wall 21 of the inlet tank 20 to a second interior wall 22 of the inlet tank 20. The first interior wall 21 of the inlet tank 20 is formed adjacent a fluid inlet 25 thereof and the second interior wall 22 is arranged opposite the first interior wall 21 and formed adjacent an inlet 41 of each of the heat exchanger passages 40. In some embodiments, the second interior wall 22 forms a portion of a header plate 23 configured to receive the inlet 41 of each of the heat exchanger passages 40. The header plate 23 may be coupled to a remainder of the inlet tank 20 by any suitable coupling means, including the use of welding, brazing, crimping, or threaded fasteners, as non-limiting examples. The first interior wall 21 and the second interior wall 22 of the inlet tank 20 may be arranged substantially parallel to each other, but other configurations may be used without departing from the scope of the present invention. The width D2 is a distance measured from a first interior wall 31 of the outlet tank 30 to a second interior wall 32 of the outlet tank 30. The first interior wall 31 of the outlet tank 30 is formed adjacent a fluid outlet 35 thereof and the second interior wall 32 is arranged opposite the first interior wall 31 and formed adjacent an outlet 42 of each of the heat exchanger passages 40. In some embodiments, the second interior wall 32 forms a portion of a header plate 33 configured to receive the outlet 42 of each of the heat exchanger passages 40. The header plate 33 may be coupled to a remainder of the outlet tank 30 by any suitable coupling means, including the use of welding, brazing, crimping, or threaded fasteners, as non-limiting examples. The first interior wall 31 and the second interior wall 32 of the outlet tank 30 may be arranged substantially parallel to each other, but other configurations may be used without departing from the scope of the present invention. The length D3 is a distance measured from the inlet 41 of each of the heat exchanger passages 40 to the corresponding outlet 42 thereof.

The inlet tank 20 may have any suitable shape and configuration while maintaining the relationship between the first interior wall 21, the second interior wall 22, the fluid inlet 25, and the inlet 41 of each of the heat exchanger passages 40. Similarly, the outlet tank 30 may have any suitable shape and configuration while maintaining the relationship between the first interior wall 31, the second interior all 32, the fluid outlet 35, and the outlet 42 of each of the heat exchanger passages 40. For instance, either of the inlet tank 20 and the outlet tank 30 may include substantially cylindrical portions, rectangular parallelepiped portions, tapered portions, and curvilinear surfaces, as non-limiting examples. Additionally, the heat exchanger passages 40 may be any form of heat exchanger passages 40 known in the art. The heat exchanger passages 40 may for instance be traditional flat tube passages formed from a sheet of aluminium or the heat exchanger passages 40 may be multi-port extruded tubes. However, the heat exchanger passages 40 may have any suitable size, shape, and configuration, including having a cross-section that is circular, elliptical, rectangular, curvilinear, or split to include multiple flow channels (not shown) included in a single heat exchanger passage 40, as non-limiting examples, so long as the heat exchanger passages 40 connect the inlet tank 20 to the outlet tank 30 and maintain the length D3.

The fluid inlet 25 is formed at an end of a conduit 27 and may extend a distance D4 beyond the first interior wall 21 of the inlet tank 20. The conduit 27 may be formed integrally with the remainder of the inlet tank 20 or the conduit 27 may be formed separately and coupled to the remainder of the inlet tank 20 using any suitable coupling means including the use of welding, brazing, crimping, or threaded fasteners, as non-limiting examples. The inlet 41 of each of the heat exchanger passages 40 may extend a distance D5 beyond the second interior wall 22 of the inlet tank 20.

The fluid outlet 35 is formed at an end of a conduit 37 and may extend a distance D6 beyond the first interior wall 31 of the outlet tank 30. The conduit 37 may be formed integrally with the remainder of the outlet tank 30 or the conduit 37 may be formed separately and coupled to the remainder of the outlet tank 30 using any suitable coupling means including the use of welding, brazing, crimping, or threaded fasteners, as non-limiting examples. The outlet 42 of each of the heat exchanger passages 40 may extend a distance D7 beyond the second interior wall 32 of the outlet tank 30.

The dimensions D1, D2, D3, D4, D5, D6, and D7 all represent dimensions that have been identified as sound travel path distances within the heat exchanger 10 that are important in determining a frequency and an amplitude of sound that may be destructively and constructively interfered with within the heat exchanger 10. Accordingly, one method of passively suppressing sound frequencies and amplitudes carried through the heat exchanger 10 via the first fluid is by altering one or more of the dimensions D1, D2, D3, D4, D5, D6, and D7 to "tune" the heat exchanger 10 to a desired configuration. The tuning is accomplished by altering any distances which incident and reflected sound waves travel into, through, or out of certain regions of the heat exchanger 10. The dimensions D1, D2, D3, D4, D5, D6, and D7 may accordingly be selected to create destructive interference within the heat exchanger 10 that reduces the amplitude of any sound having a predetermined frequency that may be in need of suppression. Alternatively, the dimensions D1, D2, D3, D4, D5, D6, and D7 may be selected to amplify the amplitude of any sound having a predetermined frequency by means of constructive interference, as desired.

The heat exchanger 10 may be tuned to reduce the amplitude of certain frequencies or ranges of frequencies of sound waves flowing therethrough by altering any combination of the dimensions D1, D2, D3, D4, D5, D6, and D7. In some embodiments, only the dimensions D1, D2, and D3 are altered to tune the heat exchanger 10, while in other embodiments the tuning may be accomplished by altering the dimensions of only one or both of the inlet tank 20 (D1, D4, D5) and the outlet tank 30 (D2, D6, D7), as desired. If multiple heat exchangers 10 are used in series in the same system, it may be beneficial to tune the heat exchanger 10 disposed furthest upstream of the remaining heat exchangers 10 if only one of the heat exchangers is to be tuned. It may also be beneficial to dispose any heat exchanger 10 that has been tuned for a specific frequency at a location downstream and adjacent to the component causing the noise that is intended to be suppressed. For instance, the heat exchanger 10 may be disposed immediately downstream of the turbocharger to eliminate the propagation of any undesirable sound frequencies formed within the turbocharger.

In use, the first fluid enters the heat exchanger 10 via the conduit 27 and the fluid inlet 25 and flows through the inlet tank 20, the plurality of heat exchanger passages 40, and the outlet tank 30 before exiting the heat exchanger 10 via the fluid outlet 35 and the conduit 37. The first fluid exchanges heat energy with a second fluid flowing over an exterior surface of the heat exchanger passages 40. In the case of a charge air cooler, the second fluid acts as a coolant for cooling the first fluid (air) before it enters an intake region of the engine. As the first fluid enters the heat exchanger 10, sound waves formed upstream of the heat exchanger 10 may also enter the heat exchanger 10. The sound waves may strike any of the surfaces forming the interior of the heat exchanger 10, thereby causing at least some of the sound waves to bounce off the interior surfaces and proceed in an opposing direction or transverse direction relative to a direction the sound waves were traveling before striking the interior surfaces. Accordingly, at least some of the sound waves will encounter other sound waves traveling in an opposing direction. If the dimensions D1, D2, D3, D4, D5, D6, and D7 are properly preselected, or "tuned," a predefined frequency or range of frequencies of the sound waves may be caused to be destructively interfered with as the sound waves travel the distances D1, D2, D3, D4, D5, D6, and D7 before entering new regions of the heat exchanger 10.

The sound wave travel distances D1, D2, D3, D4, D5, D6, and D7 may accordingly be preselected to promote each of the sound waves traveling a predetermined distance before changing direction, thereby allowing at least some of the sound waves to be put out of phase with other sound waves present within the heat exchanger 10. The occurrence of out of phase sound waves encountering each other within the interior of the heat exchanger 10 thereby causes at least some of the sound waves to destructively interfere with other sound waves traveling within the heat exchanger 10. Accordingly, the preselected frequencies of sound waves may be lowered in amplitude due to the destructive interference when the sound waves encounter each other, which in turn aids the heat exchanger 10 in militating against noises formed within the turbocharger system propagating to a passenger compartment of the vehicle having the heat exchanger 10. Alternatively, as described hereinabove, the heat exchanger 10 may also be chosen to have the dimensions D1, D2, D3, D4, D5, D6, and D7 be preselected to allow for constructive interference of any sound waves carrying through the heat exchanger 10 to amplify a preselected frequency of sound wave, as desired.

Referring now to FIG. 2, the heat exchanger 10 is shown with a perforated plate 50 disposed within the inlet tank 20. The perforated plate 50 may extend in a direction substantially perpendicular to a direction of a flow of air through the inlet tank 20 and may be disposed between the fluid inlet 25 and the plurality of heat exchanger passages 40. The perforated plate 50 may cover an entire cross-section of the interior of the inlet tank 20, causing the perforated plate 50 to abut an interior of the inlet tank 20 about a perimeter of the perforated plate 50. The perforated plate 50 includes an array of perforations 51 formed therein, wherein the perforations 51 provide fluid communication between the fluid inlet 25 and the heat exchanger passages 40. A size, shape, number, and arrangement of the perforations 51 may be selected to ensure that the heat exchanger 10 has desirable sound suppression and air flow characteristics, including minimizing a pressure drop in the air flowing through the heat exchanger 10. The perforations 51 may be formed in an array extending in at least two perpendicular directions to cover a two-dimensional surface of the perforated plate 50. For example, the perforations 51 may be formed in the perforated plate 50 in a grid pattern including linear rows and columns or the perforations 51 may be formed in an alternating offset arrangement, as desired.

The perforated plate 50 may be disposed within the inlet tank 20 at a preselected distance from each of the first interior wall 21 and the second interior wall 22 of the inlet tank 20. The perforated plate is shown in FIG. 2 as being disposed a distance D8 from the first interior wall 21 while also being disposed a distance D9 from the second interior wall 22. The perforated plate 50 may also be disposed in parallel arrangement to the first interior wall 21 and the second interior wall 22, if desired.

The perforated plate 50 within the inlet tank 20 provides additional surfaces off which sound waves may be deflected within the inlet tank 20, causing the sound suppression characteristics of the inlet tank 20 to be different from that of an inlet tank 20 devoid of the perforated plate 50. The sound suppression characteristics of the inlet tank 20 may also be altered by changing the position of the perforated plate 50 within the inlet tank 20 to alter the distance each of the sound waves bounces between the perforated plate 50 and the interior walls 21, 22. Accordingly, the distances D8 and D9 are additional variables in addition to the dimensions D1, D2, D3, D4, D5, D6, and D7 that may be altered in the heat exchanger 10 having the perforated plate 50 disposed therein to destructively or constructively interfere with sound waves having a predetermined frequency or range of frequencies.

It should be understood that the perforated plate 50 may also be disposed within the outlet tank 30 of the heat exchanger 10 to achieve a similar effect, as desired. Because the inlet tank 20 and the outlet tank 30 are substantially symmetric in form and configuration, it should be understood that the perforated plate 50 may be positioned within the outlet tank 30 in a manner wherein a distance measured from the perforated plate 50 to each of the first interior wall 31 and the second interior wall 32 may be selected to promote the desired degree of sound interference within the outlet tank 30. Additionally, it should also be understood that the heat exchanger 10 may include one of the perforated plates 50 disposed in both the inlet tank 20 and the outlet tank 30, or only in the outlet tank 30, as desired.

Referring now to FIG. 3, the heat exchanger 10 is shown as having a plate 60 including an array of plate conduits 65 extending therethrough. The plate 60 includes a first major surface 61 and an oppositely arranged second major surface 62. In similar fashion to the perforated plate 50, the first major surface 61 of the plate 60 may be spaced from the first interior wall 21 by the distance D8 while the second major surface 62 of the plate 60 may be spaced from the second interior wall 22 by the distance D9. The plate conduits 65 provide fluid communication between the fluid inlet 25 and the heat exchanger passages 40. The plate 60 may be formed with a plurality of perforations formed therein for receiving each of the plate conduits 65, wherein the plate conduits 65 are then coupled to the plate 60 by any suitable means including welding or brazing, as non-limiting examples. In other embodiments, the plate 60 may be formed in a manufacturing process to include the plate conduits 65 integrally formed therein. In such cases, the plate 60 may be formed in a moulding or stamping process, as non-limiting examples. The plate 60 may extend across a cross-section of the interior of the inlet tank 20 or may extend across only a portion of the cross-section of the interior of the inlet tank 20. A size, shape, number, and arrangement of the plate conduits 65 may be selected to ensure that the heat exchanger 10 has desirable sound suppression and air flow characteristics, including minimizing a pressure drop in the air flowing through the heat exchanger 10. The plate conduits 65 may be formed in an array extending in at least two perpendicular directions to cover a two-dimensional surface of the plate 60. For example, the plate conduits 65 may be formed in the plate 60 in a grid pattern including linear rows and columns or the plate conduits 65 may be formed in an alternating offset arrangement, as desired. The plate conduits 65 may extend beyond either major planar surface 61, 62 of the plate 60. An inlet 67 of each of the plate conduits 65 may extend a distance D10 from the first major surface 61 of the plate 60 while an outlet 68 of each of the plate conduits 65 may extend a distance D11 from the second major surface 62 of the plate 60.

The addition of the plate 60 having the plate conduits 65 formed therein adds even more surfaces off which sound waves may bounce than does the perforated plate 50. Accordingly, any of the dimensions D1, D2, D3, D4, D5, D6, D7, D8, D9, D10, and D11 may be preselected to tune the heat exchanger 10 having the plate 60 disposed therein to destructively or constructively interfere with sound waves having a predetermined frequency or range of frequencies.

It should be understood that the plate 60 may also be disposed within the outlet tank 30 of the heat exchanger 10 to achieve a similar effect, as desired. Because the inlet tank 20 and the outlet tank 30 are substantially symmetric in form and configuration, it should be understood that the plate 60 may be positioned within the outlet tank 30 in a manner wherein a distance measured from the plate 60 to each of the first interior wall 31 and the second interior wall 32 may be selected to promote the desired degree of sound interference within the outlet tank 30. Additionally, it should also be understood that the heat exchanger 10 may include one of the plates 60 disposed in both the inlet tank 20 and the outlet tank 30, or only in the outlet tank 30, as desired.

Referring now to FIGS. 4-7, a heat exchanger 110 according to another embodiment of the invention is disclosed. The heat exchanger 110 further includes a passive sound suppression structure integrated therein. The heat exchanger 110 may have substantially similar structure to the heat exchanger 10, including an inlet tank 120, a plurality of heat exchanger passages 140, and an outlet tank (not shown). Although not shown, it should be understood that the outlet tank may be substantially symmetric in many respects relative to the inlet tank 120, as desired.

FIG. 4 illustrates the inlet tank 120 of the heat exchanger 110. The inlet tank 120 includes an inlet conduit 127 providing fluid communication with a hollow interior 129 of the inlet tank 120. A fluid inlet 125 of the inlet tank 120 is formed at an end of the inlet conduit 127 and provides fluid communication between the inlet conduit 127 and the hollow interior 129 of the inlet tank 120. The inlet conduit 127 may extend into the hollow interior 129 of the inlet tank 120 such that the fluid inlet 125 is disposed within the hollow interior 129 and spaced apart from a first interior wall 121 of the inlet tank 120. The inlet conduit 127 may have any suitable cross-sectional shape, including a circular shape, an elliptical shape, or a rectangular shape, for example. The inlet conduit 127 may also have any suitable length, as desired. A plurality of the heat exchanger passages 140 also extend into the hollow interior 129 of the inlet tank 120. Each of the heat exchanger passages 140 includes an inlet 141 formed at an end thereof, wherein each of the inlets 141 extends into the hollow interior 129 of the inlet tank 120 and is spaced apart from a second interior wall 122 of the inlet tank 120.

The inlet tank 120 further includes a first sound absorption feature 150 disposed within the inlet conduit 127, wherein the first sound absorption feature 150 forms at least one component of the passive sound suppression structure of the heat exchanger 110. The first sound absorption feature 150 may abut an interior surface 128 of the inlet conduit 127 along the entirety of a circumference thereof. For instance, if the inlet conduit 127 is cylindrical in shape, the first sound absorption feature 150 may also be cylindrical in shape and an outer diameter of the first sound absorption feature 150 may be substantially equal to an inner diameter of the inlet conduit 127, allowing the inlet conduit 127 to receive the first sound absorption feature 150 therein.

In other embodiments, the first sound absorption feature 150 may cover only a preselected portion of the inlet conduit 127, as desired, including covering only a portion of a length of the inlet conduit 127 and only extending around a portion of a circumference of the inlet conduit 127, as desired. Additionally, in some embodiments the first absorption feature 150 may only be disposed on portions of the inlet conduit 127 formed opposite each other, or may only be disposed on parallel arranged surfaces of the inlet conduit 127 in the case of an inlet conduit 127 having a non-cylindrical shape.

The first sound absorption feature 150 may be formed from a sleeve 153 of a first sound absorption material surrounding a first plate 154. The sleeve 153 of the first sound absorption material forms a portion of the first sound absorption feature 150 in contact with the interior surface 128 of the inlet conduit 127, hence the sleeve 153 should be formed to have an exterior surface having a size and shape substantially corresponding to the size and shape of the interior surface 128 of the inlet conduit 127. As such, the sleeve 153 may in some cases be formed from a layer of the first sound absorption material arranged into a cylindrical shape. The first sound absorption material may be any material suitable for absorbing sound waves of a predetermined frequency or range of frequencies within the heat exchanger 110. The first sound absorption material may be formed from a porous material containing matted or spun fibers, as a non-limiting example.

The first plate 154 is disposed on an inner surface of the layer of the first sound absorption material and may include a plurality of perforations 151 formed therein. A size, shape, number, and arrangement of the perforations 151 may be selected to ensure that the heat exchanger 110 has desirable sound suppression and air flow characteristics, including minimizing a pressure drop in the air flowing through the heat exchanger 110. The perforations 151 may for example be formed in the first plate 154 in a series of columns extending along a length of the first sound absorption feature 150 and a series of rows extending around a circumference of the first sound absorption feature 150. Alternatively, the perforations 151 may be formed in the first plate 154 in an alternating offset arrangement. The first plate 154 may have a substantially similar cross-sectional shape as the interior surface 128 of the inlet conduit 127 along a length of the first plate 154, allowing for the sleeve 153 of the first sound absorption material to have a substantially equal thickness as it extends around a circumference of the first plate 154. The first plate 154 may accordingly be formed into a substantially cylindrical shape disposed within an interior of the sleeve 153. Alternatively, the first plate 154 may be formed into any closed shape corresponding to a shape of the interior surface 128 of the inlet conduit 127.

As explained hereinabove, the first sound absorption feature 150 may not extend about an entirety of an inner circumference of the inlet conduit 127, but may instead be formed only on opposing surfaces within the inlet conduit 127. In such embodiments, instead of a sleeve 153 surrounding a cylindrical first plate 154, the first sound absorption feature 150 may be formed from two or more segments of a layer of the first sound absorption material contacting the interior surface 128 of the inlet conduit 127 and disposed between the interior surface 128 and a corresponding segment of a perforated plate, as desired.

Figure 5:
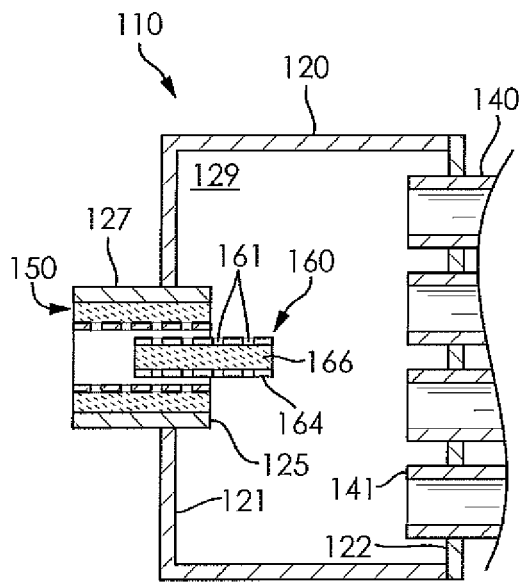
FIG. 5 is a fragmentary cross-sectional elevational view of the inlet tank illustrated in FIG. 4 having a second sound absorption feature.

Referring now to FIG. 5, the inlet tank 120 of the heat exchanger 110 is shown as having a second sound absorption feature 160 disposed therein in conjunction with the first sound absorption feature 150, wherein the second sound absorption feature 160 forms at least one component of the passive sound suppression structure of the heat exchanger 110. The second sound absorption feature 160 may be disposed along a central longitudinal axis of the inlet conduit 127, causing the first sound absorption feature 150 and the second sound absorption feature 160 to be arranged substantially concentrically. The second sound absorption feature 160 may extend at least partially into each of the inlet conduit 127 and the hollow interior 129 of the inlet tank 120. The second sound absorption feature 160 may have a substantially cylindrical shape. If a cylindrical shape is used, the second sound absorption feature 160 may be suspended along the central axis of the inlet conduit 127 through the use of supporting structures (not shown) extending between the second sound absorption feature 160 and one of the inlet conduit 127, the first sound absorption feature 150, or an interior wall of the inlet tank 120.

The second sound absorption feature 160 includes a second plate 164 and a core 166 formed from a second sound absorption material. The second sound absorption material can be any suitable material used to absorb a specified frequency or range of frequencies of sound waves. The second sound absorption material may be the same material as the first sound absorption material or the second sound absorption material may be a different material from the first sound absorption material, as desired. The second plate 164 surrounds the core 166 to form an exterior surface of the second sound absorption feature 160 and may include a plurality of perforations 161 formed therein. A size, shape, number, and arrangement of the perforations 161 may be selected to ensure that the heat exchanger 110 has desirable sound suppression and air flow characteristics, including minimizing a pressure drop in the air flowing through the heat exchanger 110. The perforations 161 may for example be formed in the second plate 164 in a series of columns extending along a length of the second sound absorption feature 160 and a series of rows extending around a circumference of the second sound absorption feature 160. Alternatively, the perforations 161 may be formed in the second plate 164 in an alternating offset arrangement, as desired. The second plate 164 may have any suitable shape, including being substantially cylindrical, for example. The second sound absorption feature 160 may extend into the hollow interior 129 of the inlet tank 20 beyond the fluid inlet 125, as desired.

In other embodiments, the second sound absorption feature 160 may instead have a flat configuration wherein the second sound absorption feature 160 extends across a cross-section of the inlet conduit 127 to divide the inlet conduit 127 into two distinct chambers to either side of the second sound absorption feature 160. In such embodiments, instead of a single second plate 164 formed into a substantially cylindrical shape the second sound absorption feature 160 may instead include a planar core 166 surrounded by a pair of perforated plates to either side of the planar core 166.

Figure 6:
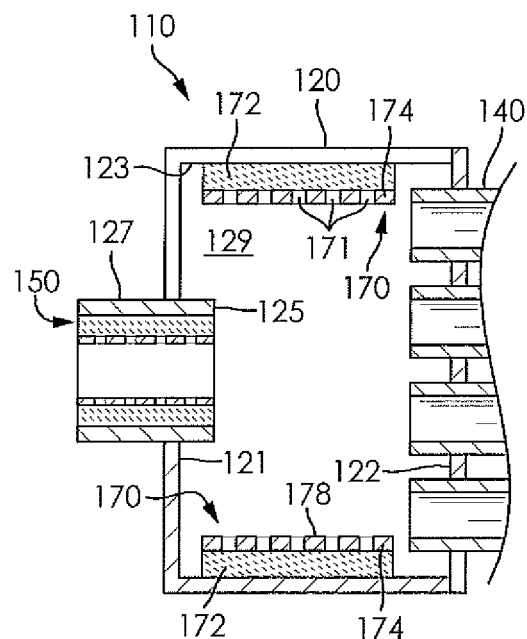
FIG. 6 is a fragmentary cross-sectional elevational view of the inlet tank illustrated in FIG. 4 having a third sound absorption feature.

FIG. 6 illustrates the inlet tank 120 of the heat exchanger 110 having the first sound absorption feature 150 disposed in the inlet conduit 127 in conjunction with a third sound absorption feature 170, wherein the third sound absorption feature 170 forms at least one component of the passive sound suppression structure of the heat exchanger 110. The third sound absorption feature 170 may be formed within the hollow interior 129 of the inlet tank 120 between the first interior wall 121 and the second interior wall 122 of the inlet tank 120. The third sound absorption feature 170 may have any suitable shape and size depending on a shape and size of the hollow interior 129 of the inlet tank 120.

The third sound absorption feature 170 may be formed from a layer 172 of a third sound absorption material and a third plate 174. The layer 172 of the third sound absorption material may be the same material or a different material from the first sound absorption material and the second sound absorption material, as desired. The third plate 174 may include an array of perforations 171 formed therein. A size, shape, number, and arrangement of the perforations 171 may be selected to ensure that the heat exchanger 110 has desirable sound suppression and air flow characteristics, including minimizing a pressure drop in the air flowing through the heat exchanger 110. The perforations 171 may for example be formed in the third plate 174 in a series of columns extending along a length of the third sound absorption feature 170 and a series of rows extending around a circumference of the third sound absorption feature 170. Alternatively, the perforations 171 may be formed in the third plate 164 in an alternating offset arrangement, as desired. The layer 172 of the third sound absorption material abuts at least a portion of an interior surface 123 of the inlet tank 120 connecting the first interior wall 121 to the second interior wall 122 thereof. In some embodiments, the layer 172 of the third sound absorption material may extend around a circumference of the interior face 123 of the inlet tank 120 to encircle any air flowing from the fluid inlet 125 to the plurality of heat exchanger passages 140. In other embodiments, the layer 172 of the third sound absorption material only covers portions of the interior surface 123 of the inlet tank 120, such as two portions of the interior surface 123 of the inlet tank 120 oppositely arranged and facing each other, for example. In either case, the third plate 174 is disposed on an inner surface of the layer 172 of the third sound absorption. Accordingly, the third plate 174 forms an interior surface 178 of the third sound absorption feature 170 in contact with a stream of the first fluid flowing through the inlet tank 120.

Figure 7:
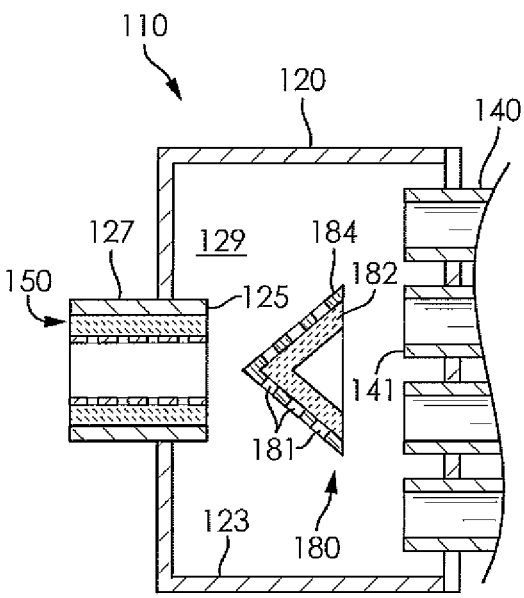
FIG. 7 is a fragmentary cross-sectional elevational view of the inlet tank illustrated in FIG. 4 having a fourth sound absorption feature.

FIG. 7 illustrates the inlet tank 120 of the heat exchanger 110 having the first sound absorption feature 150 disposed in the inlet conduit 127 in conjunction with a fourth sound absorption feature 180 disposed within the hollow interior 129 of the inlet tank 120, wherein the fourth sound absorption feature 180 forms at least one component of the passive sound suppression structure of the heat exchanger 110. The fourth sound absorption feature 180 may be disposed directly between the fluid inlet 125 and the heat exchanger passages 140. The fourth sound absorption feature 180 may be suspended in the hollow interior 129 of the inlet tank 120 via supporting structures (not shown) extending from the fourth sound absorption feature 180 to at least one of the first interior wall 121, the second interior wall 122, and the interior surface 123 extending therebetween. In other embodiments, the fourth sound absorption feature 180 may extend from one portion of the interior surface 123 to another portion of the interior surface 123, as desired.

The fourth sound absorption feature 180 is formed from a fourth plate 184 and a layer 182 of a fourth sound absorption material. The layer 182 of the fourth sound absorption material may be the same material as at least one of the first, second, and third sound absorption materials or the fourth sound absorption material may be a different material from each of the first, second, and third sound absorption materials. The fourth plate 184 may be formed on an outer surface of the layer 182 of the fourth sound absorption material. The fourth plate 184 forms a leading surface of the fourth sound absorption feature 180 that first encounters a flow of air through the inlet tank 120 while the layer 182 of the fourth sound absorption material forms a trailing surface of the fourth sound absorption feature 180. The fourth plate 184 includes an array of perforations 181 formed therein. A size, shape, number, and arrangement of the perforations 181 may be selected to ensure that the heat exchanger 110 has desirable sound suppression and air flow characteristics, including minimizing a pressure drop in the air flowing through the heat exchanger 110. The perforations 181 may for example be formed in a series of columns extending from a tip of the conically shaped fourth sound absorption feature 180 to a base thereof and a series of rows extending around a circumference of the fourth sound absorption feature 180.

As shown in FIG. 7, the fourth sound absorption feature 180 may have a substantially triangular cross-sectional shape. The fourth sound absorption feature 180 may have a substantially conical shape, for example. The conical shape of the fourth sound absorption feature 180 may allow for sound waves striking the fourth sound absorption feature 180 to be redirected in a plurality of opposing and radially outwardly extending directions, thereby promoting additional destructive sound interference within the heat exchanger 110. Alternatively, the fourth sound absorption feature 180 may be formed from two angled surfaces meeting to form the triangular cross-section thereof. In such embodiments, the fourth sound absorption feature 180 may extend across an entirely of the inlet tank 120 from one portion of the interior surface 123 of the inlet tank 120 to another portion thereof. In either case, the fourth sound absorption feature 180 is positioned in order to bounce sound waves backward when encountered by the first fluid.

It should be understood that any of the absorption features 150, 160, 170, 180 may also be adapted for use in an outlet tank (not shown) of the heat exchanger 110. Furthermore, it should be understood that any combination of the absorption features 150, 160, 170, 180 may be utilized within the heat exchanger 110, hence the combinations of absorption features 150, 160, 170, 180 illustrated in FIGS. 4-7 are non-limiting examples of potential configurations of the heat exchanger 110.

In use, the first fluid, which may be air, enters the inlet tank 120 via the inlet conduit 127 and flows through the hollow interior 129 of the inlet tank 120, the plurality of heat exchanger passages 140, and the outlet tank before exiting the heat exchanger 110. As the first fluid flows through the inlet tank 120, any of the absorption features 150, 160, 170, 180 disposed within the heat exchanger 110 create additional surfaces for reflecting or absorbing sound waves having frequencies that may cause undesirable noise generation within the passenger compartment of the vehicle. For example, the first fluid may be bounced off of any plates 154, 164, 174, 184 to cause the sound waves to potentially destructively interfere with each other within the inlet tank 120. Additionally, those sound waves not encountering the plates 154, 164, 174, 184 may pass through one of the perforations 151, 161, 171, 181 and encounter one of the sound absorption materials, thereby reducing an amplitude of those sound waves due to the acoustical energy of the first fluid being transformed into heat energy when the first fluid encounters frictional forces within the porous sound absorption materials. Similarly, the perforations 151, 161, 171, 181 may be sized to create a similar effect when sound waves present in the first fluid pass through each of the perforations 151, 161, 171, 181. Accordingly, by increasing the number of surfaces capable of reflecting the sound waves and capable of absorbing the sound waves due to frictional forces, a probability of sound absorption occurring within the heat exchanger 110 is increased. The form and location of the absorption features 150, 160, 170, 180 also beneficially reduce a pressure drop of the air within the heat exchanger 110 due to the heat exchanger 110 providing very little flow restriction. It should also be understood that the heat exchanger 110 may also be tuned in similar fashion to the heat exchanger 10 by varying the dimensions of the inlet tank 20 or by repositioning any of the absorption features 150, 160, 170, 180 therein.

From the foregoing description, one ordinarily skilled in the art can easily ascertain the essential characteristics of this invention and, without departing from the spirit and scope thereof, can make various changes and modifications to the invention to adapt the invention to various usages and conditions.

What is claimed is:

1. A heat exchanger comprising:
an inlet tank having a hollow interior formed between a first interior wall thereof and an oppositely arranged second interior wall thereof;
an inlet conduit extending through the first interior wall and in fluid communication with the hollow interior of the inlet tank, a first end of the inlet conduit disposed within the hollow interior of the inlet tank and spaced from the first interior wall;

an outlet tank having a hollow interior formed between a third interior wall thereof and an oppositely arranged fourth interior wall thereof;

an outlet conduit extending through the third interior wall and in fluid communication with the hollow interior of the outlet tank, a first end of the outlet conduit disposed within the hollow interior of the outlet tank and spaced from the third interior wall;

a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein a substantially planar perforated plate is disposed between and arranged parallel to the first interior wall and the second interior wall of the inlet tank, wherein the perforated plate further includes a first major surface, an oppositely arranged second major surface, and a plurality of conduits extending through the perforated plate, each of the conduits including a first end extending beyond the first major surface of the perforated plate and a second end extending beyond the second major surface of the perforated plate, the first end of each of the conduits spaced apart from the first major surface of the perforated plate by a first sound wave travel distance of the plurality of sound wave travel distances and the second end of each of the conduits spaced apart from the second major surface of the perforated plate by a second sound wave travel distance of the plurality of preselected sound wave travel distances.

2. The heat exchanger of claim 1, wherein the plurality of surfaces causes destructive interference of a preselected set of sound waves as the sound waves travel the preselected sound wave travel distances.

3. The heat exchanger of claim 2, wherein the first interior wall spaced apart from the second interior wall by a third sound wave travel distance of the plurality of preselected sound wave travel distances; wherein the third interior wall spaced apart from the fourth interior wall by a fourth sound wave travel distance of the plurality of preselected sound wave travel distances; the fluid inlet spaced apart from the fluid outlet by a fifth sound wave travel distance of the plurality of preselected sound wave travel distances.

4. The heat exchanger of claim 3, wherein the inlet conduit extends beyond the first interior wall the first end of the inlet conduit spaced apart from the first interior wall by a sixth sound wave travel distance of the plurality of preselected sound wave travel distances; wherein the fluid inlet of the heat exchanger passage extends beyond the second interior wall and is disposed within the hollow interior of the inlet tank, the fluid inlet of the heat exchanger passage spaced apart from the second interior wall by a seventh sound wave travel distance of the plurality of preselected sound wave travel distances.

5. The heat exchanger of claim 4, wherein the first end of the outlet conduit is spaced apart from the third interior wall by an eighth sound wave travel distance of the plurality of preselected sound wave travel distances; wherein the fluid outlet of the heat exchanger passage extends beyond the fourth interior wall and is disposed within the hollow interior of the outlet tank, the fluid outlet of the heat exchanger passage spaced apart from the fourth interior wall by a ninth sound wave travel distance of the plurality of preselected sound wave travel distances.

6. The heat exchanger of claim 5, wherein the perforated plate spaced apart from the first interior wall by a tenth sound wave travel distance of the plurality of preselected sound wave travel distances, the perforated plate also spaced apart from the second interior wall by an eleventh sound wave travel distance of the plurality of preselected sound wave travel distances.

7. A heat exchanger comprising:
an inlet tank having a hollow interior formed between a first interior wall thereof and an oppositely arranged second interior wall thereof;

an inlet conduit extending through the first interior wall and in fluid communication with the hollow interior of the inlet tank, a first end of the inlet conduit disposed within the hollow interior of the inlet tank and spaced from the first interior wall;

an outlet tank having a hollow interior formed between a third interior wall thereof and an oppositely arranged fourth interior wall thereof;

an outlet conduit extending through the third interior wall and in fluid communication with the hollow interior of the outlet tank, a first end of the outlet conduit disposed within the hollow interior of the outlet tank and spaced from the third interior wall;

a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein the sound suppression structure further comprises a first sound absorption feature, wherein the first sound absorption feature is disposed on an interior surface of the inlet conduit, the first sound absorption feature including a layer of a first sound absorption material, and wherein the sound suppression structure further comprises a second sound absorption feature comprising a layer of a second sound absorption material disposed on an interior surface of the inlet tank and a perforated plate formed on an inner surface of the layer of the second sound absorption material.

8. The heat exchanger of claim 7, wherein the second sound absorption feature is disposed on a wall of the inlet tank connecting a first side of the inlet tank having the inlet conduit extending therefrom to a second side of the inlet tank having the heat exchanger passage extending therefrom.

9. A heat exchanger comprising:
- an inlet tank having a hollow interior formed between a first interior wall thereof and an oppositely arranged second interior wall thereof;
- an inlet conduit extending through the first interior wall and in fluid communication with the hollow interior of the inlet tank, a first end of the inlet conduit disposed within the hollow interior of the inlet tank and spaced from the first interior wall;
- an outlet tank having a hollow interior formed between a third interior wall thereof and an oppositely arranged fourth interior wall thereof;
- an outlet conduit extending through the third interior wall and in fluid communication with the hollow interior of the outlet tank, a first end of the outlet conduit disposed within the hollow interior of the outlet tank and spaced from the third interior wall;
- a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and
- a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein the sound suppression structure further comprises a first sound absorption feature, wherein the first sound absorption feature is disposed on an interior surface of the inlet conduit, the first sound absorption feature including a layer of a first sound absorption material, and wherein the sound suppression structure further comprises a second sound absorption feature extending at least partially into the inlet conduit, the second sound absorption feature comprising a core formed from a second sound absorption material and a perforated plate surrounding the core.

10. The heat exchanger of claim 9, wherein the first sound absorption feature and the second sound absorption feature are arranged concentrically.

11. The heat exchanger of claim 9, wherein the core and the perforated plate are both cylindrical in shape.

12. A heat exchanger comprising:
- an inlet tank having a hollow interior formed between a first interior wall thereof and an oppositely arranged second interior wall thereof;
- an inlet conduit extending through the first interior wall and in fluid communication with the hollow interior of the inlet tank, a first end of the inlet conduit disposed within the hollow interior of the inlet tank and spaced from the first interior wall;
- an outlet tank having a hollow interior formed between a third interior wall thereof and an oppositely arranged fourth interior wall thereof;
- an outlet conduit extending through the third interior wall and in fluid communication with the hollow interior of the outlet tank, a first end of the outlet conduit disposed within the hollow interior of the outlet tank and spaced from the third interior wall;
- a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and
- a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein the sound suppression structure further comprises a first sound absorption feature, wherein the first sound absorption feature is disposed on an interior surface of the inlet conduit, the first sound absorption feature including a layer of a first sound absorption material, and wherein the first sound absorption material is porous and includes at least one of matted fibers and spun fibers.

13. A heat exchanger comprising:
- an inlet tank having a hollow interior formed between a first interior wall thereof and an oppositely arranged second interior wall thereof;
- an inlet conduit extending through the first interior wall and in fluid communication with the hollow interior of the inlet tank, a first end of the inlet conduit disposed within the hollow interior of the inlet tank and spaced from the first interior wall;
- an outlet tank having a hollow interior formed between a third interior wall thereof and an oppositely arranged fourth interior wall thereof;
- an outlet conduit extending through the third interior wall and in fluid communication with the hollow interior of the outlet tank, a first end of the outlet conduit disposed within the hollow interior of the outlet tank and spaced from the third interior wall;
- a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and
- a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein the sound suppression structure further comprises a first sound absorption feature, wherein the first sound absorption feature is disposed on an interior surface of the inlet conduit, the first sound absorption feature including a layer of a first sound absorption material, and wherein a perforated plate is disposed on an inner surface of the layer of the first sound absorption material.

14. A heat exchanger comprising:
an inlet tank having a hollow interior formed between a first interior wall thereof and an oppositely arranged second interior wall thereof;
an inlet conduit extending through the first interior wall and in fluid communication with the hollow interior of the inlet tank, a first end of the inlet conduit disposed within the hollow interior of the inlet tank and spaced from the first interior wall;
an outlet tank having a hollow interior formed between a third interior wall thereof and an oppositely arranged fourth interior wall thereof;
an outlet conduit extending through the third interior wall and in fluid communication with the hollow interior of the outlet tank, a first end of the outlet conduit disposed within the hollow interior of the outlet tank and spaced from the third interior wall;
a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and
a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein the sound suppression structure further comprises a first sound absorption feature, wherein the first sound absorption feature is disposed on an interior surface of the inlet conduit, the first sound absorption feature including a layer of a first sound absorption material, wherein the interior surface of the inlet conduit is substantially cylindrical in shape and the layer of the first sound absorption material is formed into a cylindrical sleeve received within the inlet conduit, and wherein a cylindrically shaped perforated plate is disposed on an inner surface of the cylindrical sleeve of the first sound absorption material.

15. A heat exchanger comprising:
an inlet tank having a hollow interior formed between a first interior wall thereof and an oppositely arranged second interior wall thereof;
an inlet conduit extending through the first interior wall and in fluid communication with the hollow interior of the inlet tank, a first end of the inlet conduit disposed within the hollow interior of the inlet tank and spaced from the first interior wall;
an outlet tank having a hollow interior formed between a third interior wall thereof and an oppositely arranged fourth interior wall thereof;
an outlet conduit extending through the third interior wall and in fluid communication with the hollow interior of the outlet tank, a first end of the outlet conduit disposed within the hollow interior of the outlet tank and spaced from the third interior wall;
a heat exchanger passage extending between the inlet tank and the outlet tank, the heat exchanger passage extending through the second interior wall and the fourth interior wall and including a fluid inlet disposed within the inlet tank and spaced from the second interior wall and a fluid outlet disposed within the outlet tank and spaced from the fourth interior wall; and a sound suppression structure integrated in at least one of the inlet tank, the outlet tank, and the heat exchanger passage, the sound suppression structure configured to passively suppress a preselected set of sound waves present within the heat exchanger, wherein the sound suppression structure includes a plurality of surfaces formed within at least one of the inlet tank, the outlet tank, and the heat exchanger passage spaced apart from each other by a plurality of preselected sound wave travel distances, wherein the sound suppression structure further comprises a first sound absorption feature, wherein the first sound absorption feature is disposed on an interior surface of the inlet conduit, the first sound absorption feature including a layer of a first sound absorption material, and wherein the sound suppression structure further comprises a second sound absorption feature disposed between the inlet conduit and the heat exchanger passage, wherein the second sound absorption feature comprises a conically shaped layer of a second sound absorption material and a conically shaped perforated plate disposed on an outer surface of the layer of the second sound absorption material, wherein a pointed end of each of the conically shaped layer of the second sound absorption material and the conically shaped perforated plate points towards the inlet conduit.

\* \* \* \* \*